(12) United States Patent
Zanetti et al.

(10) Patent No.: US 12,077,391 B2
(45) Date of Patent: Sep. 3, 2024

(54) CONVEYING SYSTEM AND METHOD OF CONVEYING A PLURALITY OF PRODUCTS

(71) Applicant: Fuji Seal International, Inc., Osaka (JP)

(72) Inventors: Stefano Zanetti, Rodigo (IT); Pietro Asnicar, Rodigo (IT); Andrea Sabbadini, Rodigo (IT)

(73) Assignee: Fuji Seal International, Inc., Osaka (JP)

( * ) Notice: Subject to any disclaimer, the term of this patent is extended or adjusted under 35 U.S.C. 154(b) by 0 days.

(21) Appl. No.: 17/913,312

(22) PCT Filed: Mar. 18, 2021

(86) PCT No.: PCT/IB2021/052279
§ 371 (c)(1),
(2) Date: Sep. 21, 2022

(87) PCT Pub. No.: WO2021/191753
PCT Pub. Date: Sep. 30, 2021

(65) Prior Publication Data
US 2023/0110445 A1  Apr. 13, 2023

(30) Foreign Application Priority Data

Mar. 25, 2020 (LU) .................................. LU101702

(51) Int. Cl.
*B65G 47/24* (2006.01)
*B65C 9/04* (2006.01)
(Continued)

(52) U.S. Cl.
CPC ............. *B65G 47/24* (2013.01); *B65G 47/31* (2013.01); *B65C 9/04* (2013.01); *B65G 54/02* (2013.01); *B65G 2203/0225* (2013.01)

(58) Field of Classification Search
CPC ....... B65C 9/04; B65C 9/045; B65G 47/2445; B65G 54/02; B65G 47/24; B65G 47/244; B65G 47/31
See application file for complete search history.

(56) References Cited

U.S. PATENT DOCUMENTS

| 3,944,455 | A  | * | 3/1976 | French .................. B65C 9/1892 |
| | | | | 156/542 |
| 10,640,300 | B2 | * | 5/2020 | Achterberg .......... B65G 47/244 |

(Continued)

FOREIGN PATENT DOCUMENTS

| DE | 102014107427 B4 * | 4/2018 | ............. B65B 17/02 |
| EP | 3385803 A1 | 10/2018 | |

(Continued)

OTHER PUBLICATIONS

Search Report dated Dec. 18, 2020, issued for LU101702.

*Primary Examiner* — James R Bidwell
(74) *Attorney, Agent, or Firm* — Locke Lord LLP

(57) ABSTRACT

Disclosed is a conveying system comprising: a track, a plurality of carriages to be conveyed on the track, each carriage comprising: a main body which is held along the track; and a receptacle rotatably supported by the main body and configured for receiving a product, and further comprising a receptacle-rotating member which is configured to advance, at a defined advancing speed, along a region provided at at least a portion of the track, and to control the rotational orientation of the carriage's receptacles; wherein each carriage can be in engagement, via its receptacle, with the receptacle-rotating member.

18 Claims, 4 Drawing Sheets

Figure 1:
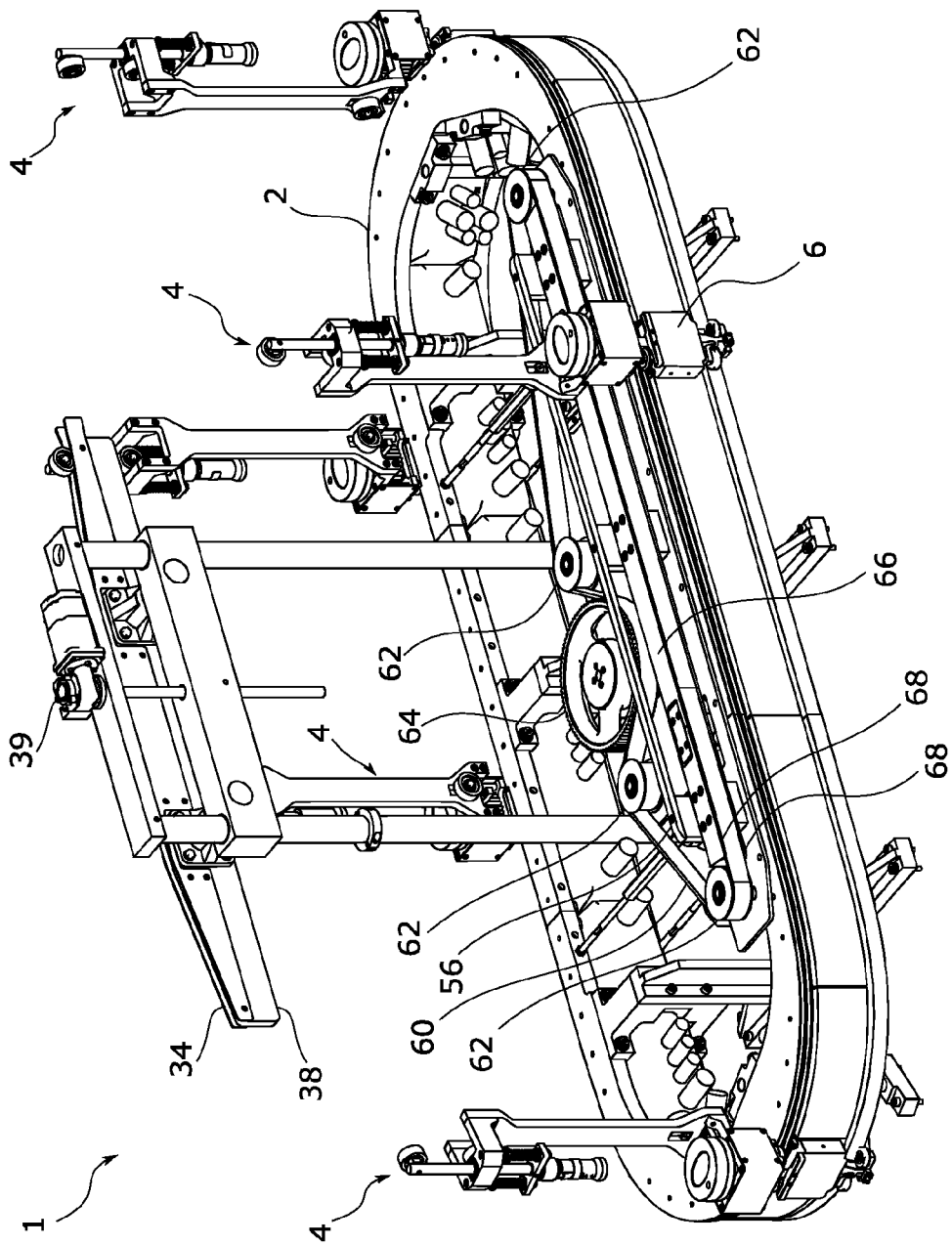

(51) Int. Cl.
*B65G 47/31* (2006.01)
*B65G 54/02* (2006.01)

(56) References Cited

U.S. PATENT DOCUMENTS

2014/0291116 A1\* 10/2014 Williams ........... B65G 47/2445
198/379
2019/0055091 A1 2/2019 Achterberg et al.

FOREIGN PATENT DOCUMENTS

| JP | 2015-003771 A | 1/2015 | | |
|---|---|---|---|---|
| WO | WO-2019049031 A1 | \* | 3/2019 | ............... B65C 9/04 |
| WO | 2020/001987 A1 | | 1/2020 | |

\* cited by examiner

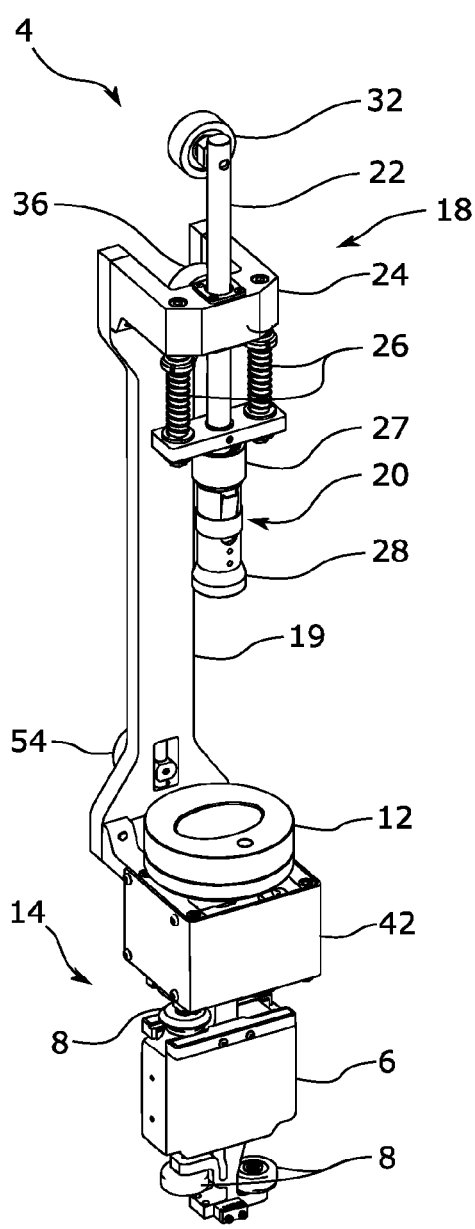
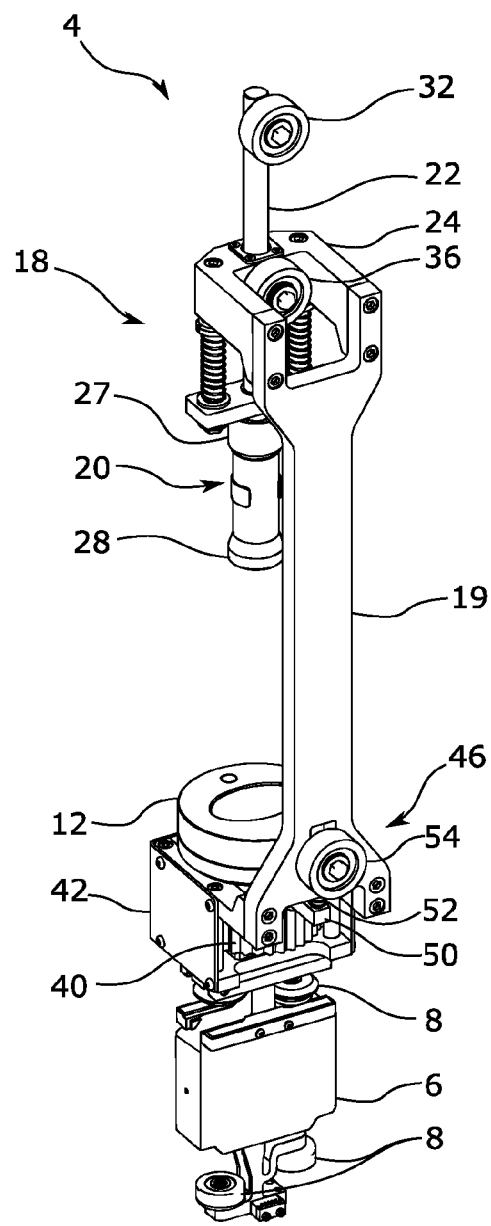
Fig. 2      Fig. 3

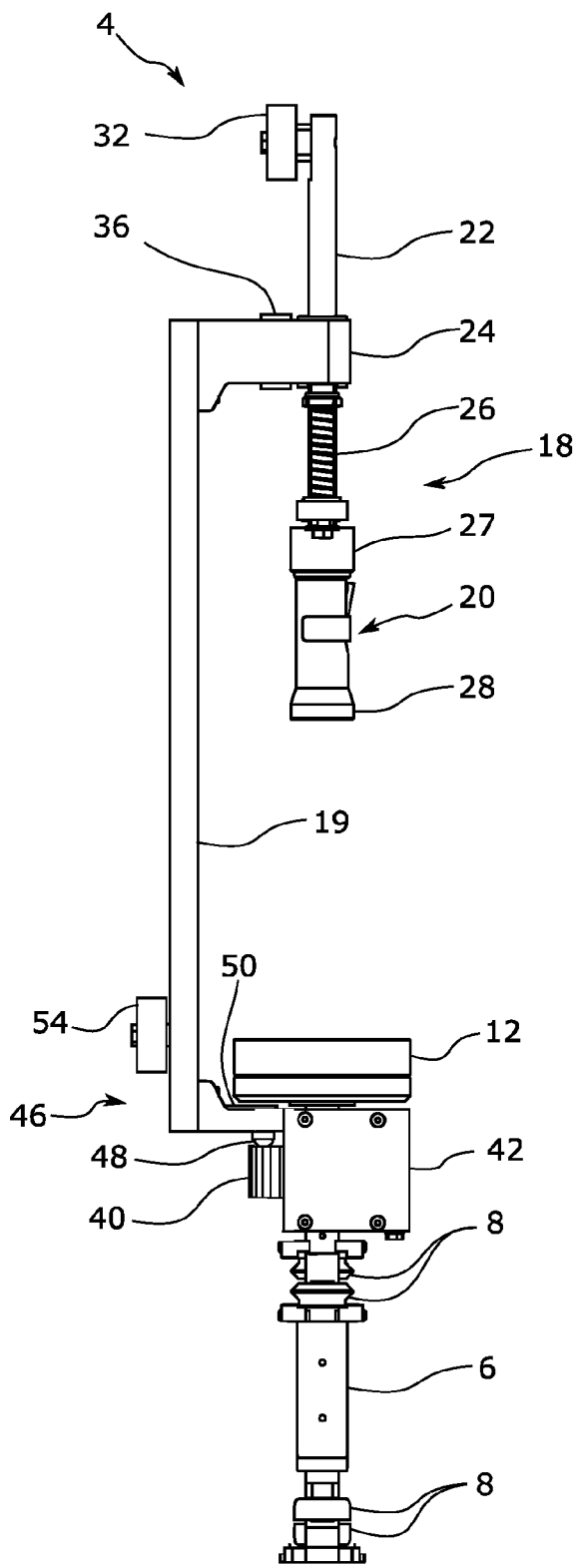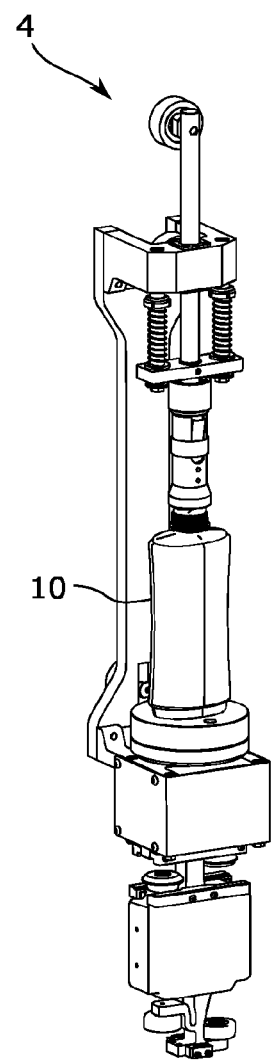
Fig. 4
Fig. 5

CONVEYING SYSTEM AND METHOD OF CONVEYING A PLURALITY OF PRODUCTS

TECHNICAL FIELD

The present invention relates to a conveying system, in particular a conveying system comprising a track and a plurality of carriages, and a method of conveying a plurality of products using the conveying system.

BACKGROUND ART

Conventional techniques for applying a label to a product have been developed, the product being for example a plastic bottle for containing food or cosmetics. One such technique is to introduce the products from a production line to a labelling machine and then returning them to the production line. The product is rotated as the label is applied, especially in the case of wraparound labels. A known technique is to place a plurality of cylindrical products on a rotating carousel, the products rotating also on their respective axes, as they are introduced to the labelling machine. The production rate is limited by the rotation speed and capacity of the carousel. The production rate can be increased by increasing the carousel capacity, for example by increasing the carousel diameter. But this results in an increase in the footprint of the carousel.

Precise control of the product's orientation is needed in the case where a predetermined orientation of the label is desired, such as in the case of non-cylindrical products. Precise product orientation is also needed for laser marking and inspection, for example. Furthermore after labelling, the products typically need to have a predetermined orientation for a subsequent process. Conventional techniques include providing a downstream aligning device or employing human operators.

Generally there is a need to convey products while having a high level of control of their orientation and maintaining a high production rate.

JP2015003771A discloses a workpiece positioning device that aligns the rotational position of a workpiece held by a jig conveyed by a conveyor in a certain direction; the conveyor is a pair of endless belts.

A conveyor system comprising a linear motor is known from EP3385803A1.

SUMMARY OF THE INVENTION

It is an object of the invention to provide a way to more precisely control the orientation of a product while it is being conveyed. The object is achieved by the respective subject-matters of the independent claims. Advantageous further developments are subject-matter of the dependent claims.

Disclosed is a conveying system according to the invention, comprising: a track, a plurality of carriages to be conveyed on the track, each carriage comprising: a main body which is held along the track; and a receptacle rotatably supported by the main body and configured for receiving a product, and further comprising a receptacle-rotating member which is configured to advance, at a defined advancing speed, along a region provided at at least a portion of the track, and to control the rotational orientation of the receptacle of each carriage; wherein each carriage can be in engagement, via its receptacle, with the receptacle-rotating member; said engagement is conditional on the respective carriage being in the region, and the rotational orientation of the receptacle of each carriage relative to the carriage's main body is dependent on a relationship between said carriage's conveyance speed in the region and the advancing speed; furthermore the conveying system is configured to control the rotational orientation of the receptacle of each carriage relative to the carriage's main body by controlling each carriage's conveyance speed in the region independently of the conveyance speeds of the other carriages.

In other words a receptacle can be rotated by being in engagement with a receptacle-rotating member provided alongside the track (which may be a loop). The rotational speed depends on the relationship (e.g. is proportional—such as linearly proportional—to a difference) between the conveyance speed of the carriage under engagement and the advancing speed of the receptacle-rotating member.

So the track in an orienting (e.g. labelling) area can be straight—the design of the conveying system is simplified; for example carousel transports with a plurality of servomotor-driven supports are not needed. As well as being able to set a predetermined orientation of the support at a predetermined position on the track, it is possible to set a predetermined speed and/or range of rotation.

The conveying system may be configured to control the rotational orientation of a carriage's receptacle, or the rotational orientation of a product to be received by the receptacle, by controlling a difference between the conveyance speed of the carriage and the advancing speed.

When the conveyance speed of each carriage is independent of the advancing speed, the advancing speed has no effect on the conveyance speeds, so control is simplified.

The conveying system may comprise at least one sensor for determining a rotational orientation of a product to be received on a receptacle (preferably each receptacle). The conveying system may also be configured to determine the rotational orientation of the product, and optionally to adjust the conveyance speed of said receptacle's carriage, based on a signal from the sensor. So it is not to needed for the products to have a common orientation as it enters the region. Preferably the conveying system may be configured to control the speed of conveyance of the carriage and the speed of advancing of the driving member, based on the determination, preferably by means of a control unit.

When at least one carriage has a restricting mechanism configured to restrict rotation of the receptacle relative to the main body in dependence on the position or positions of the carriage on the track, and preferably the restricting mechanism is released at least when said carriage is in the region, a desired orientation of each product can be reliably set.

At least one carriage may have a pulley coupled to the receptacle which is rotatable in accordance with rotation of the pulley. The receptacle-rotating member may preferably be a belt engageable with the pulley, and further preferably the conveyance of said carriage may be by means of a transmission of force to the main body, the transmission path to the main body bypassing the pulley. So the pulley and the belt can engage and disengage easily. So it is easily provided that any force reaching the main body via the pulley achieves only rotation.

It may be provided that at least one carriage comprises a product-holding mechanism that is configured to urge a product to be received by the receptacle towards the receptacle. Further preferably the urging may be releasable in dependence on a position or positions of said carriage on the track. So orientation of each product can be reliably held and released at predetermined places.

The conveying system may be configured to adjust a pitch between carriages. So by achieving irregular pitches, especially in the region, the desired orientation of the products can be easily achieved. For example conveying system may be configured to bring a product received by the receptacle to a predetermined orientation or orientations when the carriage reaches a predetermined position or positions on the track. Multiple labels can be applied by achieving intermittent rotations.

The conveying system may preferably control the speeds of conveyance of the carriages independently from each other, further preferably at all places on the track.

The conveying system may be configured to vary the conveyance speed of a carriage, such as when the carriage is in the region. So the carriage can accelerate and/or decelerate when in the region, allowing intermittent rotation for example. The advancing speed may be variably controlled.

The conveying system may be configured to stop the carriage's receptacle from rotating by conveying the carriage in at least a part of the region at a speed equal to the advancing speed. So by matching a conveyance speed with the advancing speed, zero rotation of the receptacle is easily achieved, even when the carriage is still travelling.

A method, according to the invention, of conveying a plurality of products using the conveying system of the present invention, comprises: providing each product on the receptacle of a respective carriage, determining a target rotational orientation of each product, and achieving the target rotational orientations while conveying carriages through the region by controlling the advancing speed and each carriage's conveyance speed in the region. The determining of the rotational orientation of each product may be by means of a sensor.

SHORT DESCRIPTION OF THE FIGURES

Figure 6:
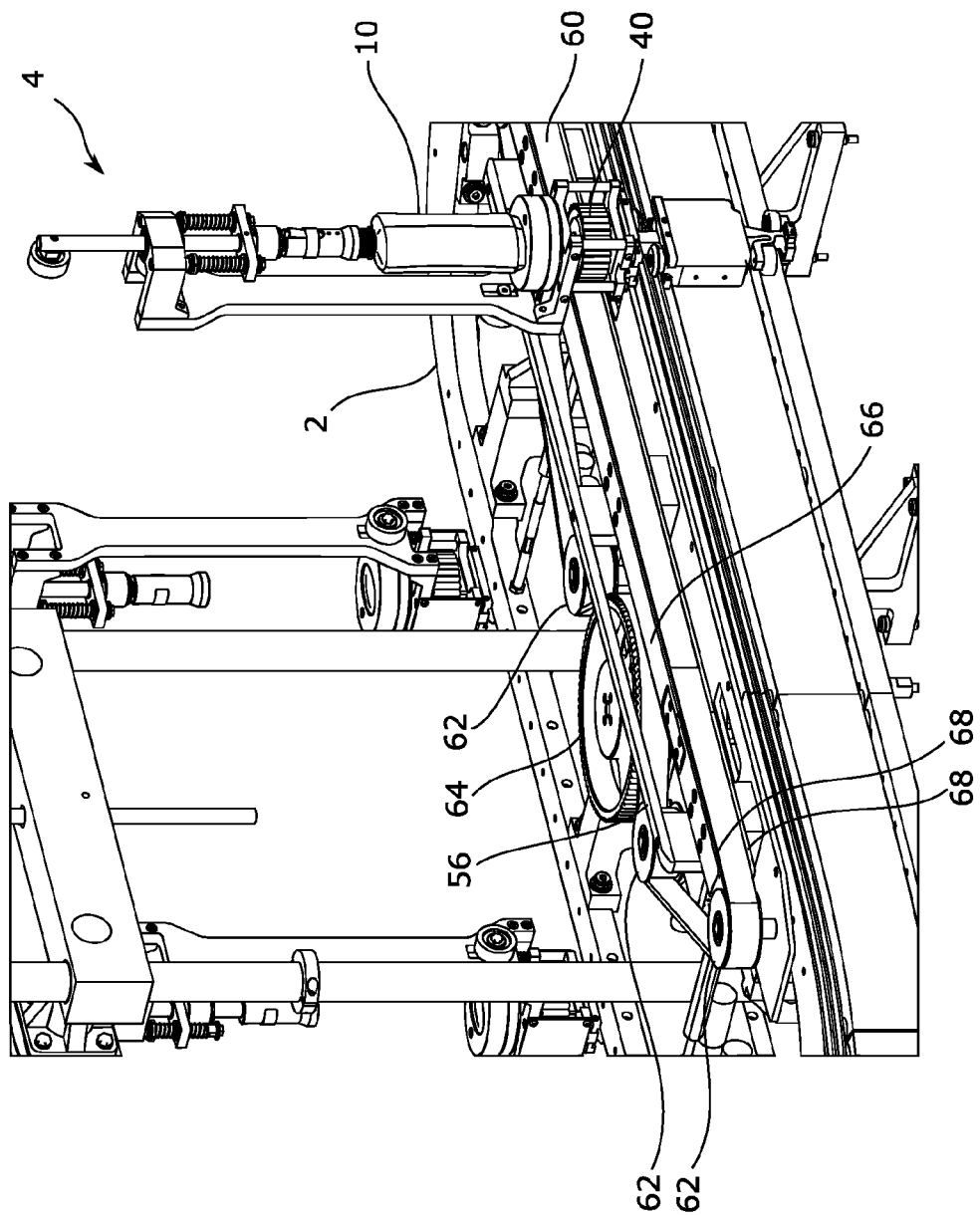

A preferred embodiment is described in more detail in the following with the help of the appended figures, wherein:

FIG. 1 shows a view of a conveying system according to an embodiment of the invention, FIG. 2 shows a view of a carriage of the conveying system, FIG. 3 shows a reverse view of the carriage, FIG. 4 shows a side view of the carriage, FIG. 5 shows a view of the carriage holding a product, and FIG. 6 shows a view of the conveying system in operation.

DETAILED DESCRIPTION OF PREFERRED EMBODIMENTS

FIG. 1 shows a representation of a conveying system 1 (hereinafter "system") according to an embodiment of the invention. The system 1 comprises a stationary track 2 which is formed as a loop (oblong circuit) and on which a plurality of carriages 4 are arranged so that they can be conveyed while being held along the track 2. The track 2 has a modular form and comprises electric windings which can be energised to create a magnetic field. Each carriage 4 comprises e.g. a magnet 6 which can interact with the magnetic field. The track 2 and each carriage 4 forms a respective linear synchronous motor, the track 2 forming a common stator and each carriage 4 forming a rotor, as is known in the art. Thus it is possible to control the conveyance (such as speed and/or conveyance position) of each carriage 4 independently. The carriages 4 can be conveyed or be kept stationary at all portions of the track 2, by means of the linear motor.

As shown best in FIGS. 2 to 5, each carriage 4 has a turntable-like receptacle 12 for receiving a respective product 10. The receptacle 12 is plate-like and rotatably supported by a non-rotating main body 14 of the carriage. The axis of rotation is vertical. The receptacle 12 has a top surface suited for receiving a particular product. A lower part of the main body 14 comprises the aforementioned magnet 6 and a plurality of wheels for engaging with raceways on the track 2.

The carriage 4 has a product-holding mechanism 18 configured to urge a product 10 (FIG. 5) to be received by the receptacle 12 towards the receptacle 12. The product-holding mechanism 18 is provided on the carriage 4 at a predetermined height above the receptacle 12 by being supported by a vertical beam 19 and comprises a jack 20 which can move within a predetermined range in the vertical direction. The jack 20 is a columnar member with a lower portion 28 having a closed end. The vertical movement is enabled by means of a bearing having a limited stroke corresponding to the predetermined range. To this end the jack 20 is attached to the lower end of a rod 22 which is slidingly received in a though-hole in a bearing block 24 fixed to the upper end of the vertical beam 19. The rod 22 and the bearing block 24 form a linear plain bearing. The jack 20 is spring-loaded so as to be urged downward (parallel to the rotation axis of the receptacle 12) within the predetermined range, by means of two upper compression springs 26 provided on respective linear guides on either side of the rod 22. The jack 20 is rotatable relative to the rod 22 via a rotational thrust bearing 27. Alternatively or in addition the lower portion 28 may be rotatably attached to the rest of the jack 20. The carriage 4 is configured to hold a product 10 between the receptacle 12 and the jack 20 (see FIG. 5), while the lower portion 28 of the jack 20 is in contact with a top surface of the product 10 to urge it toward the receptacle 12. A product 10 is thus firmly holdable and releasable by the carriage 4.

An upper cam roller 32 is rotatably fixed to the upper end of the rod 22 and is configured to engage with an upper cam surface 34 (FIG. 1) which is fixed relative to the track 2. When the carriage 4 is in a predetermined region of the track 2 where the upper cam surface 34 is provided, the upper cam roller 32 moves upward, by being urged by the upper cam surface 34, and so the rod 22 is also urged upwards to overcome the spring load from the upper compression springs 26 which become compressed. Thus the rod 22 slides upwards in the bearing block 24. In this way the urging load on any product 10 from the carriage 4 can be released. When the upper cam roller 32 disengages from the upper cam surface 34 the rod 22 is urged by the upper compression springs 26 so the product 10 is again firmly held.

An intermediate cam roller 36 is rotatably fixed to the bearing block 24 and is configured to engage with an intermediate cam surface 38 which is fixed relative to the track 2. When the carriage 4 is in a predetermined region of the track 2 where the intermediate cam surface 38 is provided, the intermediate cam roller 36 makes contact with the intermediate cam surface 38 without significant urging. The intermediate cam roller 36 need not be configured to move up or down, nor be spring-loaded. Thus the carriage 4 is reliably guidingly supported by the contact between the intermediate cam roller 36 and the intermediate cam surface 38. So any upward urging forces from the upper cam surface 34 to the upper cam roller 32 are isolated to the product-holding mechanism 18 and so not transferred to the rest of the carriage. As shown in FIG. 1, the upper 34 and intermediate 38 cam surfaces are executed as a single beam-like member that comprises guide walls to control lateral movement of the upper cam rollers 32. As a modification the intermediate cam rollers 36 may be guided correspondingly.

The carriage 4 comprises a pulley 40 rotatably supported by the main body 14 to rotate with the receptacle 12. The receptacle 12 and the pulley 40 may be supported by a common rotational bearing (not shown) which can support thrust loads. The pulley 40 has an outer peripheral surface provided with teeth. The vertical beam 19 is fixed at its lower end to the main body 14 of the carriage 4 so that it does not rotate with the receptacle 12 and pulley 40. The pulley 40 is at least partially covered by a housing 42.

As shown best in FIGS. 3 and 4, the carriage 4 is provided with a restricting mechanism 46 which restricts (and preferably locks) the rotation of the receptacle 12. The restricting mechanism 46 has a pad 48 which is fixed to the end of a pad-holding member 50. The pad-holding member 50 is spring-loaded (by means of a lower spring 52) so as to urge the pad 48 against an upper surface of the pulley 40. The pulley 40 and therefore also the receptacle 12 can be restricted from rotating by means of the frictional force between the pad 48 and the pulley 40. The contacting surfaces of the pad 48 and the pulley 40 may be surface-treated to provide a suitable coefficient of friction. In alternative arrangements the restricting mechanism 46 may have a friction clutch or dog clutch.

As shown best in FIGS. 3 and 4, the pad-holding member 50 is connected to a lower cam roller 54 which is configured to engage with a lower cam surface 56 fixed relative to the track 2. When the lower cam roller 54 engages with the lower cam surface 56 (by means of the carriage 4 moving into the region of the track where the lower cam surface 56 is provided) the lower cam roller 54 is urged upward which compresses the lower spring 52. Thus the pad 48 moves away from the pulley 40 and the restriction on the rotation of the pulley 40 is released. When the lower cam roller 54 disengages from the lower cam surface 56 the pad 48 is urged down under the returning force of the lower spring 52 so that the pulley 40 and receptacle 12 are restricted from rotating.

FIG. 6 shows a part of the system in operation. As can be seen from this figure (and also FIG. 1), the system 1 comprises a receptacle-rotating mechanism for orienting the receptacle 12 of each carriage 4. The receptacle-rotating mechanism is provided beside the track 2 and comprises a toothed belt 60 engaging a series of driven belt-pulleys 62 and a servo-motor-operated driving belt-pulley 64 which has teeth engaging the teeth of the belt 60. The belt-pulley axes are vertical and fixed relative to the track 2. The belt-pulleys 62, 64 and belt 60 are arranged so that a straight part of the belt 60 extends alongside a region (hereinafter "belt region") of the track 2. The pulley 40 of each carriage 4 can pass though the belt region. The teeth of the belt 60 face the track 2. The belt 60 supported on its side facing away from the track 2 by a support beam 66 having a flat surface. The upper and lower extents of the flat surface are provided with two wall portions 68 extending away from the flat surface so that the belt 60 is received between these with a clearance. The support beam 66 guides and supports the portion of the belt 60 in the belt region. The belt 60 may have teeth on both sides and the belt-pulleys 62, 64 may each have teeth. Alternatively the belt 60 and the pulleys 40, 62, 64 may have no teeth. The belt 60 may be driven at a constant advancing speed. The belt 60 is an example of a receptacle-rotating member. Other examples include a roller chain or rotating corkscrew-like member. In the case of a roller chain each pulley 40, 62, 64 may be provided as a sprocket.

When a carriage 4 enters the belt region, its pulley 40 mechanically engages with the belt 60 via their respective teeth, wherein the belt 60 makes tangential contact with the pulley 40. This is an example of engagement between the receptacle 12 (and thus the carriage 4) and the receptacle-rotating member 60. At the same time (or at about the same time), the lower cam roller 54 engages with the lower cam surface 56 so as to raise the lower cam roller 54 and the pad 48, thus releasing the blocking function of the restricting mechanism 46. The pulley 40 is then free to be rotated by the belt 60. For example if the conveyance speed of the carriage 4 is higher than the advancing speed of the belt 60, the pulley 40 and receptacle 12 rotate in one direction. If the conveyance speed falls below the advancing speed of the belt 60, the pulley 40 and receptacle 12 rotate in the other direction. In both cases the speed of rotation of the pulley 40 and receptacle 12 is proportional to the difference between the conveyance speed of the carriage 4 and the advancing speed of the belt 60. If the conveyance speed of the carriage 4 is equal to the advancing speed of the belt 60, the carriage 4 is conveyed without rotation of the pulley 40 and receptacle 12, and in this case the engagement between the belt 60 and the pulley 40 has a function of restricting rotation of the pulley 40 and receptacle 12. The carriage 4 need not have a constant speed. Controlling the conveyance of the carriage may include any of generating, stopping, increasing the speed of, and decreasing the speed of, the conveyance.

The conveyance speed of the carriage 4 can be set to match the advancing speed, in particular at the time when it enters and/or leaves the belt region. For example the receptacle 12 can be set into rotation (and the restricting mechanism 46 is released) only after the carriage 4 has entered and travelled a predetermined distance in the belt region. So the ends of the belt region represent transition phases wherein shock loads resulting from sudden changes in receptacle rotation are reduced. The start and end positions of the lower cam surface 56 can be adjusted accordingly.

In this way the rotational orientation of any receptacle 12 in the belt region can be controlled by adjusting the conveyance of the respective carriage 4 independently of the orientations of the other receptacles 12 or conveyance speeds of the other carriages 4. The belt movement does not influence the conveyance speeds. In other words the receptacle-rotating mechanism does not convey the carriage 4 at any time. Preferably there is no relative sliding at the contact between the belt 60 and the pulley 40.

In alternative embodiments a transmission (e.g. an epicyclic gearbox) may be provided between the receptacle 12 and the pulley 40 so that these can relatively rotate with a predetermined gear ratio other than 1:1. The pad 48 may alternatively or in addition contact the receptacle 12 or a moving element of any transmission.

When the carriage 4 leaves the belt region, its pulley 40 disengages from the belt 60. The lower cam roller 54 disengages from the lower cam surface 56, so the pad 48 of the restricting mechanism 46 urges against the pulley 40. Even though the belt no longer effects the rotation of the receptacle 12, the rotational orientation of the receptacle 12 is controlled by the restricting mechanism 46.

In a typical use of the system 1, products 10 which are not yet received on the carriages 4 approach the track 2 from an upstream production stage, such as by means of a separate conveyor (not shown). The products 10 are sequentially transferred to respective carriages 4 by means known in the art such as an infeeding star wheel (not shown) which may be provided at a straight portion of the track 2 away from the belt 60, said straight portion being parallel to the separate conveyor.

The operation of a carriage 4 will be described (with reference to FIGS. 1 and 6), but it is to be understood that each carriage 4 operates accordingly. Shortly before a product 10 is transferred to the carriage 4 the state of the product-holding mechanism 18 changes from the held to the released state. Shortly after the product 10 is received by the receptacle 12, the state of the product-holding mechanism 18 changes to the hold state. The releasing and holding by the product-holding mechanism 18 is achieved by providing the upper 34 and intermediate 38 cam surfaces in the region of the track 2 where the product 10 is transferred. By providing the upper 34 and intermediate 38 cam surfaces only in the region of the product transfer (where the product is loaded to/unloaded from the track 2), the product 10 is reliably held on its carriage 4 by the product-holding mechanism 18 at all other regions on the track 2.

The carriage 4 carrying the firmly held product 10 is conveyed (e.g. counter-clockwise) toward the belt region, whereupon the carriage's pulley 40 engages with the belt 60, and the restricting mechanism 46 releases the pad 48 from the pulley 40. While the carriage 4 is in the belt region, the rotational orientation of the receptacle 12 is dependent on the speed of conveyance of the carriage 4 and the advancing speed or the belt 60, as described above.

The belt region is configured so that various (not-shown) production devices known in the art can be arranged alongside the belt region on the opposite side of the track 2 to the belt 60. Such production stations may comprise one or more labelling devices. For example when a carriage 4 is conveyed past a labelling device, its conveyance speed relative to the advancing speed of the belt 60 can be controlled to create an optimum rotation of the product 10 during the labelling process. Various types of label can be applied to various shapes of product 10. For example a wraparound label covering the circumference of a bottle having circular section can be applied. Alternatively a label covering a predetermined part of the circumference of a bottle of elliptical section (e.g. 10 in FIGS. 5 and 6) can be applied.

The system 1 may be configured to set a predetermined rotational orientation of the product 10 at the time that the product 10 approaches the labelling device. As an example an optical sensor (not shown) may be provided at a predetermined position in the belt region which is upstream of the labelling device. The carriage 4 can be stopped at the optical sensor (not shown), whereupon the belt 60 which advances at a constant speed effects a rotation of the product 10. An index mark provided in a predetermined place on the circumference of the product 10 can be detected by the optical sensor, and the instantaneous rotational orientation of the product 10 can be determined. The subsequent conveyance speed and rotation of the receptacle 12 can be set in accordance with the measured instantaneous orientation.

In addition a marking device may be provided at a second predetermined position in the belt region and the system 1 can be configured to mark (e.g. by laser) the product 10 at a predetermined position in the circumferential direction of its outer surface, in accordance with a determined orientation. The product 10 may be rotated or may be stationary during the marking.

Other examples of production devices that make use of the advantages of the system 1 include sealing devices such as bottle top applicators.

The carriage 4 is subsequently conveyed out of the belt region to a downstream portion of the track 2 (the urging of the pad 48 is reapplied) where the product 10 can be transferred from the carriage 4 to the aforementioned separate conveyor by means known in the art such as an outfeeding star wheel (not shown). The products 10 may be transferred from the track 2 at a straight portion of the track 2 away from the belt 60, the straight portion being parallel to the separate conveyor. The system 1 can ensure that each product 10 has a predetermined orientation at a predetermined position on the track 2 to ensure the correct function of any star wheel and/or efficient packing of a plurality of products.

Advantageously the carriages 4 need not be connected with an electricity supply via cables, for example. There is no need to provide a receptacle-rotating device on each carriage 4, such as an electric motor on each carriage, or on an auxiliary carriage that follows or leads each carriage.

The belt 60 engages with the receptacle 12 via the pulley 40, thus imparting a rotation movement on the receptacle 12. So rotation and conveyance of the products 10 is not by direct tangential forces on the product's surface. Non-circular products 10 can be easily rotated. The carriage 4 makes belt contact on only one side (being the carriage's track-facing side). This ensures that conveyance is independent of any belt movement. The conveyance of the carriage 4 is by means of a conveyance force acting on the main body 14, from below the receptacle 12.

The belt region is straight. The belt 60 may be provided alternatively or in addition on a curved part of the track 2. For example the belt 60 may be guided by a pulley having an axis of rotation coaxial with the centre of a curve radius. The belt 60 may be provided over the entirety of the track path. Alternatively two or more belts 60 may be provided along the track 2.

More than one carriage 4 can be in the belt region at the one time. Alternatively the carriages 4 pass through the belt region one at a time.

As the conveyance speed of each carriage 4 is independent of the conveyance speeds of the other carriages 4, it is to be understood that the speeds of the carriages 4 can be adjusted individually so that the pitch between a pair of carriages 4 can be changed, to the extent that the carriages 4 do not collide or overtake each other.

The term "speed" may include zero speed. In a preferable embodiment the advancing speed of the belt 60 is non-zero and constant and the conveyance speeds of the carriages 4 are independently controlled to achieve a desired orientation or rate of change of orientation of each receptacle 12. The conveyance direction may be the same as the advancing direction of the belt 60. When the conveyance direction opposes the advancing direction, the relative directions can be accounted for by considering the velocity differences of the moving elements.

In the disclosed detailed embodiment the track 2 is provided below the carriage. The track 2 may be provided above the carriage 4 so that the carriage 4 and products 10 are supported by the track 2 from above. The receptacle 12 may face upwards or downwards.

The upper 26 and lower 52 springs may be configured as coil springs or as any suitable resilient members such as ones known in the art.

The product-holding mechanism 18 need not urge the products 10 from above, but may urge the products 10 from its sides, for example.

The conveyance speeds of each carriage 4 and the advancing speed of the belt 60 may be controlled by a control unit, which can preferably control other units such as any star wheels and/or labelling devices, according to a PLC program.

The shape of the receptacle 12 and the product-holding mechanism 18, especially the lower portion 28 of the jack 20, may be chosen to suit a particular product. Different products can be processed by changing or adapting these two. The receiving face of the receptacle may have a protrusion and/or a cutout. The height of the upper 34 and intermediate 38 cam surfaces can be adjusted in accordance with the height of a particular product, by means of a mechanism driven by a motor 39 shown in FIG. 1. By selecting a suitable stroke of the product-holding mechanism 18, the carriage 4 can accommodate a range of product sizes. The track 2 may be provided with a second loop for performing offline changes to the carriages 4.

The advancing speed of the receptacle-rotating member may be uniform at all places on the receptacle-rotating member.

It is to be understood that the engagement of each carriage, via its receptacle, with the receptacle-rotating member may be direct or indirect.

The embodiments shown in the figures and described above only represent possible implementations of the claimed invention which is defined by the claims.

REFERENCE SIGNS 1 conveying system (system)
2 track
4 carriage
6 magnet
8 wheels
10 product
12 receptacle
14 main body
18 product-holding mechanism
19 vertical beam
20 jack
22 rod
24 bearing block
26 upper compression spring
27 rotational thrust bearing
28 lower portion of jack
32 upper cam roller
34 upper cam surface
36 intermediate cam roller
38 intermediate cam surface
39 motor for cam surfaces
40 pulley
42 housing
46 restricting mechanism
48 pad
50 pad-holding member
52 lower spring
54 lower cam roller
56 lower cam surface
60 belt (receptacle-rotating member)
62 driven belt-pulley
64 driving belt-pulley
66 support beam
68 wall portion of support beam

The invention claimed is:

1. A conveying system comprising:
   a track,
   a plurality of carriages to be conveyed on the track, each carriage comprising: a main body which is held along the track; and a receptacle rotatably supported by the main body and configured for receiving a product, and
   a receptacle-rotating member which is configured to advance, at a defined advancing speed, along a region provided at at least a portion of the track and to control a rotational orientation of the receptacle of each carriage, wherein
   each carriage can be in engagement, via its receptacle, with the receptacle-rotating member, wherein said engagement is conditional on the respective carriage being in the region, and
   the rotational orientation of the receptacle of each carriage relative to the carriage's main body is dependent on a relationship between said carriage's conveyance speed in the region and the advancing speed, wherein
   the conveying system is configured to control the rotational orientation of the receptacle of each carriage relative to the carriage's main body by controlling each carriage's conveyance speed in the region independently of the conveyance speeds of the other carriages, wherein
   at least one carriage has a restricting mechanism configured to restrict rotation of the receptacle relative to the main body in dependence on a position or positions of the carriage on the track, and preferably
   the restricting mechanism is released at least when said carriage is in the region.

2. The conveying system according to claim 1, configured to control the rotational orientation of a carriage's receptacle, or a rotational orientation of a product to be received by the receptacle, by controlling a difference between the conveyance speed of the carriage and the advancing speed.

3. The conveying system according to claim 1, wherein the conveyance speed of each carriage is independent of the advancing speed.

4. The conveying system according to claim 1, further comprising:
   at least one sensor for determining a rotational orientation of the product to be received on the receptacle, wherein the conveying system is configured to determine the rotational orientation of the product, and optionally to adjust the conveyance speed of said receptacle's carriage, based on a signal from the sensor.

5. The conveying system according to claim 1, wherein
   at least one carriage has a pulley coupled to the receptacle which is rotatable in accordance with rotation of the pulley,
   the receptacle-rotating member is a belt engageable with the pulley, and
   preferably the conveyance of said carriage is by means of a transmission of force to the main body, a transmission path to the main body bypassing the pulley.

6. The conveying system according to claim 1, wherein
   at least one carriage comprises a product-holding mechanism that is configured to urge the product to be received by the receptacle towards the receptacle, wherein the urging is released in dependence on a position or positions of said carriage on the track.

7. The conveying system according to claim 1, configured to adjust a pitch between carriages by controlling the speeds of conveyance of the carriages independently from each other.

8. The conveying system according to claim 1, configured to vary the conveyance speed of the carriage when the carriage is in the region.

9. The conveying system according to claim 1, configured to stop the carriage's receptacle from rotating by conveying the carriage in at least a part of the region at a speed equal to the advancing speed.

10. A method of conveying a plurality of products using the conveying system of claim 1, comprising:
    providing each product on the receptacle of a respective carriage,
    determining a target rotational orientation of each product,
    achieving the target rotational orientations while conveying the carriages through the region by controlling the advancing speed and each carriage's conveyance speed in the region.

11. The method according to claim 10, further comprising:
    the determining of the rotational orientation of each product is by means of a sensor.

12. The conveying system according to claim 2, wherein the conveyance speed of each carriage is independent of the advancing speed.

13. The conveying system according to claim 2, further comprising:
    at least one sensor for determining a rotational orientation of the product to be received on the receptacle, wherein the conveying system is configured to determine the rotational orientation of the product, and optionally to adjust the conveyance speed of said receptacle's carriage, based on a signal from the sensor.

14. The conveying system according to claim 2, wherein
    at least one carriage has a pulley coupled to the receptacle which is rotatable in accordance with rotation of the pulley,
    the receptacle-rotating member is a belt engageable with the pulley, and
    preferably the conveyance of said carriage is by means of a transmission of force to the main body, a transmission path to the main body bypassing the pulley.

15. The conveying system according to claim 2, wherein
    at least one carriage comprises a product-holding mechanism that is configured to urge the product to be received by the receptacle towards the receptacle, wherein the urging is released in dependence on a position or positions of said carriage on the track.

16. The conveying system according to claim 2, configured to adjust a pitch between carriages by controlling the speeds of conveyance of the carriages independently from each other.

17. The conveying system according to claim 2, configured to vary the conveyance speed of the carriage when the carriage is in the region.

18. The conveying system according to claim 2, configured to stop the carriage's receptacle from rotating by conveying the carriage in at least a part of the region at a speed equal to the advancing speed.

* * * * *